United States Patent

[11] 3,584,249

[72] Inventor David M. Murphy
 RFD #4, Mason City, Iowa 50401
[21] Appl No 18,668
[22] Filed Mar. 11, 1970
[45] Patented June 8, 1971

[54] ELECTRIC VIBRATOR
 5 Claims, 8 Drawing Figs.
[52] U.S. Cl. .................................................... 310/81,
 310/216, 310/193
[51] Int. Cl. ..................................................... H02k 7/06
[50] Field of Search ............................................ 310/81, 80,
 216, 193, 261, 5, 50, 269, 40

[56] References Cited
UNITED STATES PATENTS
3,361,130  1/1968  Rowe ........................... 310/81X Primary Examiner—D. X. Sliney
Attorney—Merchant and Gould ABSTRACT: An electric motor having a stator and a rotor with the stator affixed to the device to be vibrated and the rotor having a portion of the electromagnetic circuitry eliminated and nonmagnetic material, such as lead, affixed thereto to mechanically counteract the unbalanced lateral magnetic forces of the electromagnetic circuitry of the rotor at operating speeds. Thus, the rotor runs smoothly in the bearings while the unbalanced electromechanical circuitry produces vibration of the stator.

PATENTED JUN 8 1971 3,584,249
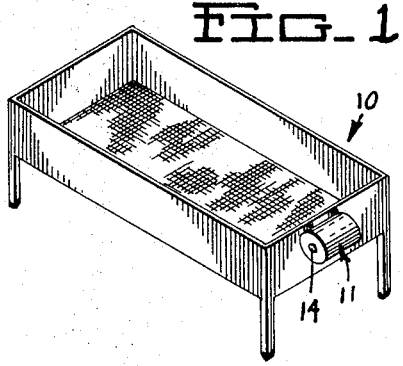
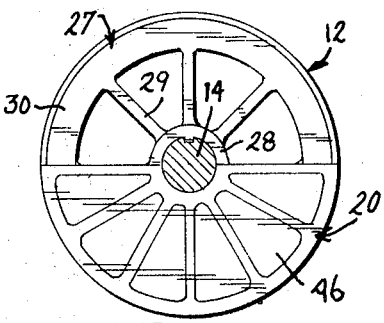
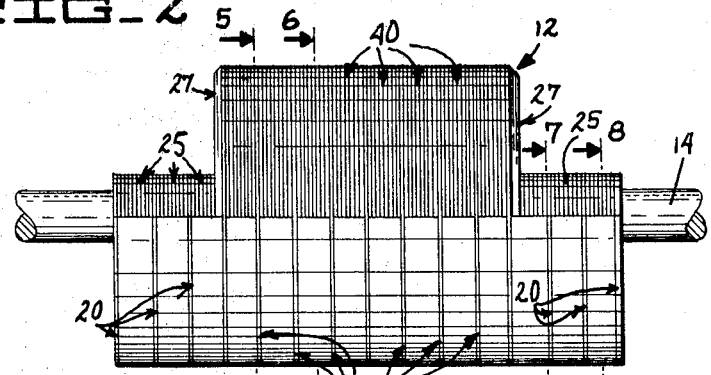
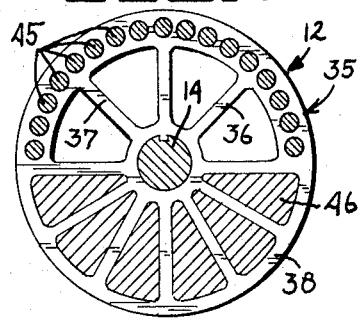
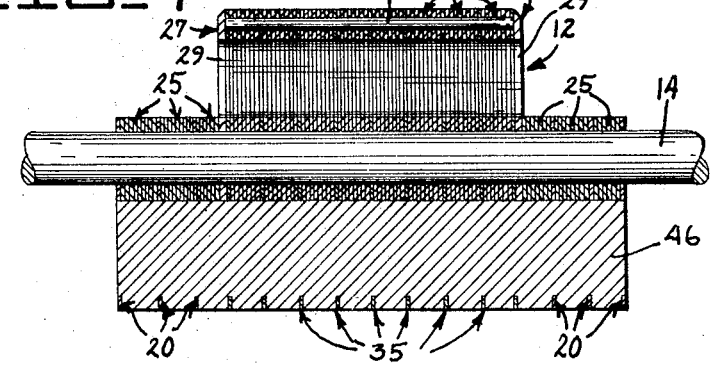
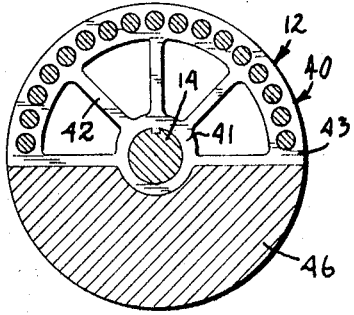
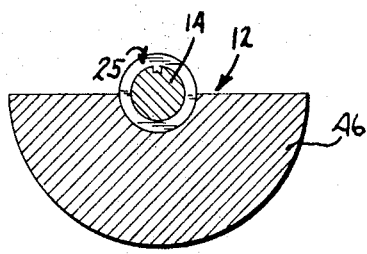
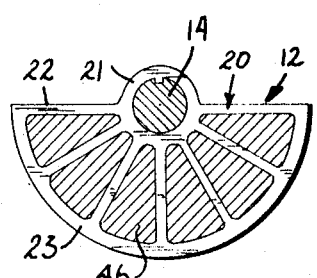
INVENTOR.
DAVID M. MURPHY
BY
Merchant & Gould
ATTORNEYS

ELECTRIC VIBRATOR

BACKGROUND OF THE INVENTION

1. Field of the Invention

The invention pertains to electrically energized vibrators which produce mechanical vibration. Such vibrators are utilized in a great variety of applications and apparatus.

2. Description of the Prior Art

In the prior art, all electrically energized vibrators are constructed by mechanically unbalancing the rotor so that rotation thereof produces vibration in the rotor. This vibration is transmitted to the stator through the bearings and, ultimately, to the device it is desired to vibrate. However, because the vibrations are transmitted through the bearings, great stress is placed on the bearings and the prior art devices have a tendency to wear out relatively quickly.

SUMMARY OF THE INVENTION

The present invention pertains to an electric vibrator including an electric motor wherein a portion of the electromagnetic circuitry of the rotor is eliminated and nonmagnetic means of such mass as to substantially counterbalance by centrifugal force, at normal operating speed of rotation, the mass of the electromagnetic portion plus the unbalanced lateral magnetic force of the electromagnetic circuitry, is affixed so that the rotor runs smoothly within the stator but vibration of the stator is produced.

It is an object of the present invention to provide a new and improved electric vibrator.

It is a further object of the present invention to provide an electric vibrator wherein the vibrations are not transmitted through the rotor mounting bearings, so that wear of the bearings is decreased and the life expectancy of the vibrator is increased.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 is a view in perspective of the present electric vibrator operatively mounted;

FIG. 2 is a view in side elevation of the rotor of the electric vibrator;

FIG. 3 is a view in end elevation of the rotor illustrated in FIG. 2;

FIG. 4 is an axial sectional view of the rotor illustrated in FIG. 2;

FIG. 5 is a sectional view as seen from the line 5-5 in FIG. 2;

FIG. 6 is a sectional view as seen from the line 6-6 in FIG. 2;

FIG. 7 is a sectional view as seen from the line 7-7 in FIG. 2; and

FIG. 8 is a sectional view as seen from the line 8-8 in FIG. 2.

DESCRIPTION OF THE PREFERRED EMBODIMENT

Referring to FIG. 1, a simple screening device generally designated 10 is illustrated having a boxlike material receiving area with a screen bottom for sifting or allowing only material of a predetermined size to pass therethrough. An embodiment of the electric vibrator, generally designated 11, is fixedly attached to one end of the screening device 10 to produce vibrations thereof. The screening device 10 is illustrated only to facilitate the description of the electric vibrator 11 and it should be understood that many other types of uses and means for mounting the electric vibrator 11 might be utilized.

The electric vibrator 11 includes an electric motor having a stator and a rotor with means on the stator for fixedly attaching the electric motor to whatever object it is desired to vibrate. It should be understood that a variety of different types of electric motors might be utilized although an induction type motor is illustrated in this preferred embodiment. Because the stator remains unchanged in the electric motor of the vibrator 11 and because the stator is a standard stator for whatever type of motor is being utilized, no description of the stator is included herein.

Referring to FIGS. 2 through 8 a modified rotor, generally designated 12, is illustrated. The modified rotor 12 replaces the standard rotor of the electric motor of vibrator 11. Rotor 12 is fixedly mounted on a shaft 14 which is rotatably mounted within the stator of the electric vibrator 11. The magnetic circuit of the rotor 12 is formed of a plurality of stacked laminations keyed to the shaft 14 to prevent rotation thereon. A first type of lamination 20 is illustrated in FIG. 7. The lamination 20 includes a central hub 21, constructed with an opening therethrough to receive the shaft 14, with a plurality of spokes 22 radiating outwardly therefrom through 180°. An outer rim 23 joins the ends of the spokes 22. The first type of lamination 20 is positioned at each end of the rotor 12 and a short portion of the rotor 12 adjacent each of the ends is formed by spacing several of the first type of laminations 20 an approximately equal distance apart by means of a plurality of washer-type laminations 25, illustrated in FIG. 8.

Two ends 27, having a hub 28 with a central opening designed to receive the shaft 14 therein, each have spokes 29 radiating outwardly from the central hub through 180° and a rim 30 joining the ends thereof. The radial width of the rim 30 is substantially greater than the width of the rim 23 and the thickness of the ends 27 is approximately twice as thick as the thickness of the first type lamination 20. Further, the ends 27 are keyed onto the shaft 14 so that they extend radially outwardly in a direction opposite to the first type laminations 20.

A second type of lamination 35 includes a hub 36 having an opening therein formed to fit the shaft 14 and a plurality of spokes 37 radiating outwardly therefrom with a rim 38 joining the ends of the spokes 37. The lower 180° of the second type laminations 35 is similar to the first type lamination 20 while the upper 180° thereof has a substantially larger rim, similar to the rim 30 of the ends 27. Further, the enlarged upper portion of the rim 38 has a plurality of holes spaced circumferentially apart. One of the second type laminations 35 is positioned adjacent the inwardly directed surface of each of the ends 27 and an additional plurality of the second type laminations 35 are approximately equally spaced therebetween. The second type laminations 35 are equally spaced by means of a plurality of a third type of laminations positioned between each of the second type of laminations 35. The third type of laminations 40 include a central hub 41 having a plurality of spokes 42 radiating outwardly therefrom through approximately 180° and an enlarged rim 43 joining the ends thereof. The rim 43 has a plurality of holes circumferentially spaced therearound. The third type of lamination 40 is similar to the upper 180° of the second type of lamination 35 and is positioned adjacent thereto so that all of the holes through the rims 38 and 43 of the laminations 35 and 40 are in alignment.

The electrical circuit of the rotor 12 includes a plurality of copper bars 45 which extend through the holes in the rims 38 and 43 of the second and third type laminations 35 and 40. The bars 45 are positioned in the holes during assembly and the ends 27 maintain them in the desired position. The ends 27 and laminations 35 and 40 constitute the magnetic circuitry of the rotor 12 and, in combination with the bars 45 will be referred to as the electromagnetic circuitry herein. Thus, the magnetic and electric circuits of the rotor 12 define a rotor having a normal or standard upper 180° while the lower 180° is eliminated, except for the spaced apart downwardly extending laminations 20. Induced electrical currents in the rotor 12 circuitry (copper bars 45) produce magnetic poles in the rotor 12 which interact with magnetic poles of the stator, in a well-known manner, to produce forces tending to rotate the rotor and, also, to attract the rotor radially outwardly (lateral magnetic force) toward the stator. In a conventional electric motor these lateral magnetic forces of attraction are equally disposed in all directions about the rotor so that they are fully counteracted; the partial circuitry in the rotor 12 of the present vibrator gives rise to noncounterbalanced magnetic forces which are utilized as will be seen presently. This unbalance of the electromagnetic circuitry in the rotor 12 causes an unbalanced lateral magnetic force on the rotor 12, since a force is being produced on only one-half of the rotor.

With the rotor 12 in the assembled condition described above, some suitable nonmagnetic material, such as lead or a lead-base alloy 46 is utilized to fill in the areas between the first type laminations 20. The material utilized should be relatively easy to position in the desired areas, such as by melting and molding, and should have sufficient mass to balance, by centrifugal force, the mass of the electromagnetic portion of the rotor plus the unbalanced lateral magnetic force of the electromagnetic portion so that the shaft 14 turns smoothly in the bearings of the stator, at the speed of rotation at which the rotor 12 normally operates. Lead was chosen in the preferred embodiment since it is relatively heavy and fulfills all of the requirements.

It should be understood that 180 mechanical degrees of the electromagnetic circuitry for the rotor 12 are eliminated in the preferred embodiment illustrated but greater or lesser amounts might be included or eliminated, depending upon the magnitude of vibrations desired, the type and size of electrical motor being utilized and the mass of material utilized to centrifugally balance the mass and lateral magnetic force of the rotor. Further, while the portion of the rotor 12 in which the electromagnetic circuitry is removed has been completely filled with lead in this preferred embodiment, it should be understood that this is simply for illustrative purposes and motors producing relatively small amounts of vibration might utilize relatively small masses of material for the centrifugal balance. Further, greater or smaller quantities of the centrifugal balancing material might be utilized with variations of mass therein.

Thus, an electric vibrator is disclosed which includes an electric motor having a stator and a rotor. The rotor is constructed with an unbalanced electromagnetic circuit and means attached thereto for centrifugally counterbalancing the rotor during rotation so that the rotor rotates smoothly within the bearings of the stator. Because of the electromagnetic circuit unbalance in the rotor an unbalanced oscillation or vibration is produced in the stator which is transmitted directly to the device upon which the stator is mounted. Because the vibrations are produced in the stator and transmitted directly through the means mounting the stator and because the rotor rotates smoothly within the bearings mounting the same, the wear on the present vibrator is approximately equal to the wear on an electric motor having a relatively small load attached thereto. The reliability and life span of the present electric vibrator is, therefore, greatly increased. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What I claim is:
1. An electric vibrator comprising:
   a. an electric motor having a stator and a rotor with coacting electromagnetic circuitry therein;
   b. the electromagnetic circuitry of the rotor encompassing substantially less than 360° thereof for producing an unbalance in lateral magnetic force exerted by the electromagnetic circuitry of the motor in each rotation of the rotor;
   c. means having a predetermined mass affixed to the rotor for centrifugally counterbalancing the lateral magnetic force unbalance and producing substantially smooth rotation of the rotor within the stator; and
   d. said unbalanced lateral magnetic force producing vibration of said electric motor.
2. An electric vibrator as set forth in claim 1 wherein the electric motor is an induction type.
3. An electric vibrator as set forth in claim 2 wherein the means having a predetermined mass includes a nonmagnetic material defining a substantially arcuate section of said rotor within which the electromagnetic circuitry is substantially excluded.
4. An electric vibrator as set forth in claim 1 wherein the electromagnetic circuitry is eliminated from an arcuate section of said rotor encompassing approximately 180° and the arcuate section is defined by a nonmagnetic material.
5. An electric vibrator as set forth in claim 4 wherein the nonmagnetic material includes lead.